United States Patent [19]

Vidwans

[11] 4,393,424
[45] Jul. 12, 1983

[54] PRESSURE ARM ASSEMBLY FOR DISC RECORDERS

[75] Inventor: Mohan P. Vidwans, Saline, Mich.

[73] Assignee: Sycor, Inc., Ann Arbor, Mich.

[21] Appl. No.: 235,587

[22] Filed: Feb. 18, 1981

Related U.S. Application Data

[63] Continuation of Ser. No. 50,704, Jun. 21, 1979, abandoned.

[51] Int. Cl.³ .......................... G11B 5/54; G11B 25/04
[52] U.S. Cl. ........................................ 360/105; 360/86; 360/97
[58] Field of Search ............ 360/105, 104, 106, 97–99, 360/130.1, 130.34, 133, 137, 86

[56] References Cited

U.S. PATENT DOCUMENTS

| Re. 29,380 | 8/1977 | Castrodale et al. | 360/105 |
|---|---|---|---|
| 3,529,301 | 9/1970 | Hiruta | 360/105 X |
| 3,702,997 | 11/1972 | Jamieson | 360/105 X |
| 3,913,137 | 10/1975 | Morgan | 360/98 |
| 4,058,844 | 11/1977 | Dirks | 360/106 |
| 4,089,029 | 5/1978 | Castrodale et al. | 360/105 X |
| 4,151,573 | 4/1979 | Tandon et al. | 360/105 X |

OTHER PUBLICATIONS

IBM/TDB vol. 18, No. 7, Dec. 1975, pp. 2246–2247, "Read/Write Head Load-Unload Device", by Bailey et al.
IBM/TDB vol. 18, No. 9, Feb. 1976, pp. 3018–3019, "Magnetic Head Load/Unload Device", by Wheeler.

*Primary Examiner*—John H. Wolff
*Attorney, Agent, or Firm*—Price, Heneveld, Huizenga & Cooper

[57] ABSTRACT

A pressure arm assembly is disclosed for use in a data recorder of the type employing a disc recording medium and a carrier supporting a magnetic head. The pressure arm assembly includes a bracket and an upper arm pivotally carried by the bracket for rotation about a transverse axis. A spring biases the arm into engagement with the head carrier. An automatic release lever is carried by the bracket and holds the upper arm in a first nonoperating position and releases the arm so that it may pivot under the action of the spring upon insertion of a disc into the data recorder.

19 Claims, 6 Drawing Figures

PRESSURE ARM ASSEMBLY FOR DISC RECORDERS

This is a continuation of application Ser. No. 06/050,704, filed June 21, 1979.

BACKGROUND OF THE INVENTION

The present invention relates to data recorders/reproducer devices of the type employing a limp, flexible, magnetic oxide coated disc and more particularly to such devices which record on both sides of the disc.

Various forms of data recorder/reproducer devices have been proposed which employ a "floppy", flexible disc recording medium. The disc is coated with a magnetic oxide and placed in a sleeve-like protective envelope or jacket. The jacket and disc are commonly referred to as a diskette. Such data recorder device include a rigid holder which receives the diskette. The holder includes slots extending radially from a hub aperture at which at least one magnetic head is positioned. A carriage and drive assembly translates the head radially along the disc as the disc is rotated. An example of such a data recorder may be found in commonly owned U.S. Pat. No. 3,913,137 entitled TWIN FLEXIBLE DISC RECORDER WITH MOVABLE HEADS and issued on Oct. 14, 1975 to Samuel A. Morgan.

Data recorders of the type disclosed in the aforementioned patent employ a single head for each disc or double heads which permit recording on both sides of one disc. These latter types of data recorders are typically referred to as double-sided flexible disc recorders. Prior double-sided recorders have typically employed solenoid actuated devices to selectively position the heads into contact with both sides of the disc. Problems have been experienced with using solenoid operated devices to bias recording heads into engagement with the disc medium. The magnetic fields associated with the solenoids have had an adverse effect on record and playback quality.

A need exists for a device capable of biasing the heads of a data recorder of the floppy disc type into engagement with a disc whereby the problems heretofore experienced with magnetic fields associated with solenoid devices are substantially alleviated.

SUMMARY OF THE INVENTION

In accordance with the present invention, a mechanical device is provided for exerting a biasing force on a magnetic head carrier in a floppy disc recorder. Essentially, the device includes a support member and a pressure means carried by the support member for movement between a first nonoperating position and a second operating position at which it engages a head positioner or carrier and biases a magnetic head into contact with a disc recording medium. Provision is made for holding the pressure means in the nonoperating position and automatically releasing same for movement to the second position upon insertion of a diskette into the recorder.

DETAILED DESCRIPTION OF THE PREFERRED EMBODIMENT

Figure 1:
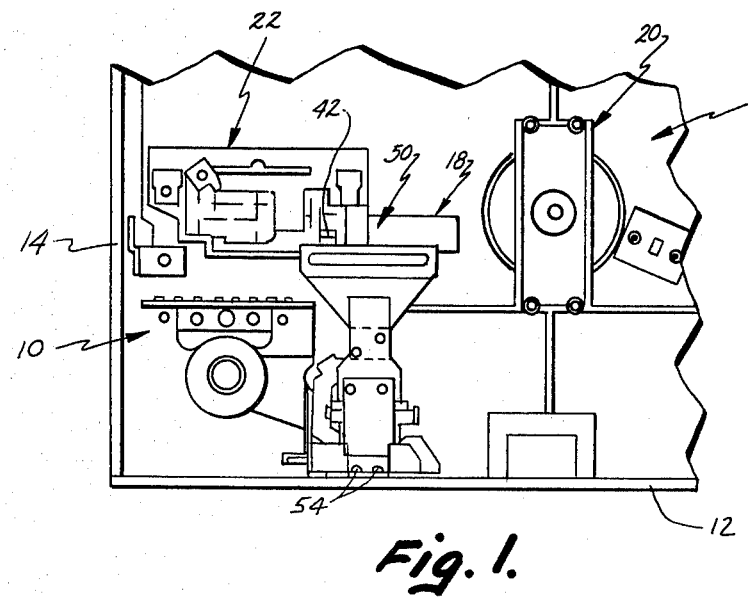
FIG. 1 is a fragmentary, side elevational view of a floppy disc recorder including the pressure assembly in accordance with the present invention.
Figure 6:
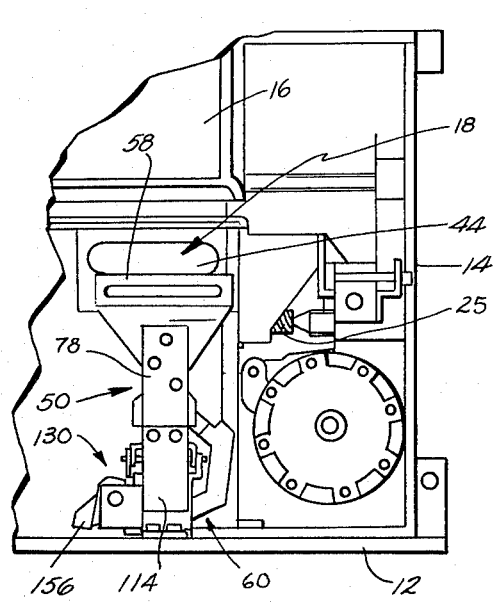
FIG. 6 is a side, elevational view of a data recorder showing the manner of operation of the pressure arm assembly.
Figure 2:
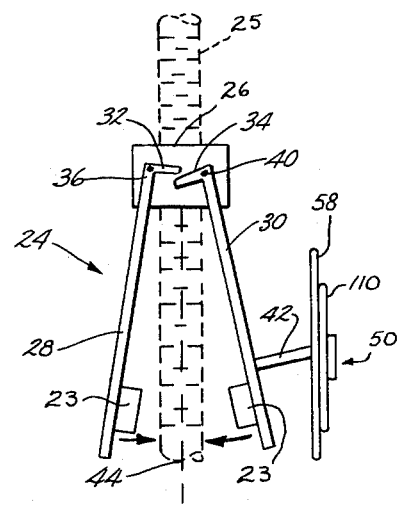
FIG. 2 is a top plan view schematically illustrating a head positioner of a type useable in the data recorder of FIG. 1.

A portion of a data recorder device of the type employing a "floppy", flexible disc medium or diskette and capable of recording on both sides of the disc is illustrated in FIG. 1 and generally designated 10. As shown therein, the recorder includes a rigid base 12 and a frame 14 to which are attached the various components of the recorder. The recorder includes at least one diskette receiver or holder 16 pivotally secured to the frame 14. Holder 16 includes a radial slot 18. A hub assembly 20 rotates a disc disposed within holder 16. Supported on frame 14 is a head carrier or head positioner assembly generally designated 22 and which supports a pair of magnetic heads 23 (FIG. 2). The carrier is driven by a conventional lead screw drive 25 (FIG. 6). The heads supported thereon are translated radially of the disc along the open slot 18. When a diskette is positioned within holder 16, the magnetic heads will be translated radially along the disc as it is driven by the hub 20. Holder 16 is mounted for pivotal movement so that it may be rotated relative to the hub 20 permitting insertion of the diskette.

Schematically illustrated in FIG. 2 is a head positioner generally designated 24 which forms part of assembly 22. Head positioner 24 includes a member 26 secured to the carrier assembly 22 and translated by the lead screw drive. Pivotally mounted on member 26 are a pair of head support arms 28, 30 which are biased to an open position by a spring. Each arm supports a head 23 in a conventional fashion. Each head support arm 28, 30 is generally L-shaped in plan and includes camming portions 32, 34. Arms 28, 30 are each pivoted to member 26 at points 36, 40. An actuator arm 42 extends perpendicular from support arm 30. As should be readily apparent from FIG. 2, as actuator arm 42 is shifted, support 30 is moved towards support 28. Legs 32, 34 will cam against each other. Support 28 moves inwardly towards a diskette 44 schematically shown in FIG. 2 in response to movement of support arm 30. Head positioner 24 and other elements of the data recorder described above are conventional, readily available commercial items. These portions of the data recorder form no part of the present invention but have been illustrated and described so that the environment of the present invention may be more fully understood.

Figure 3:
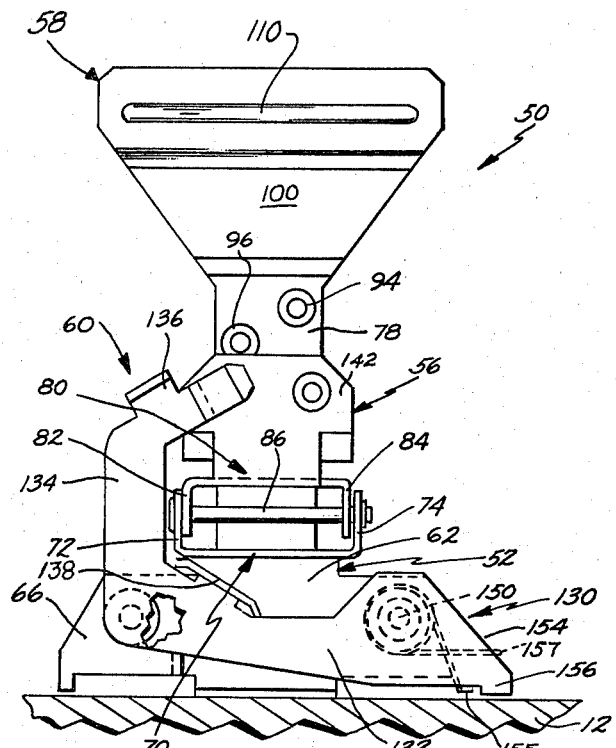
FIG. 3 is a front, elevational view of the pressure arm assembly in accordance with the present invention.
Figure 5:
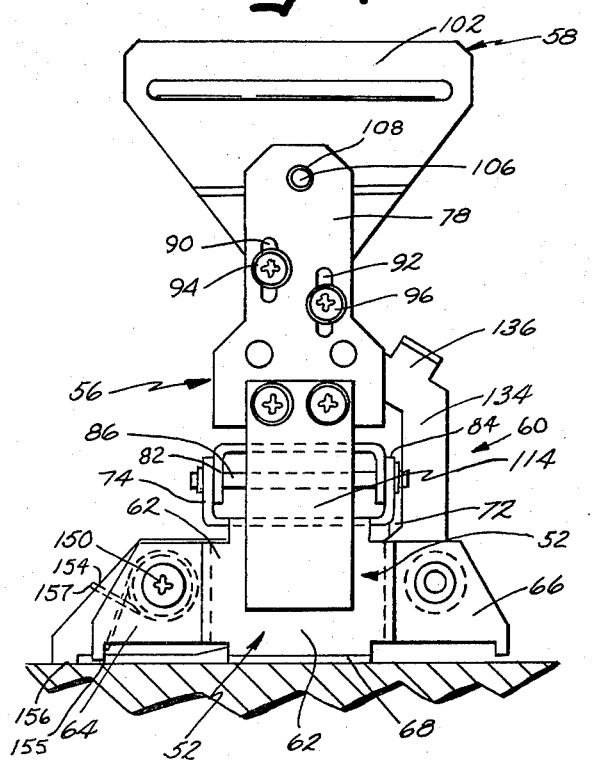
FIG. 5 is a rear, elevational view of the pressure assembly.
Figure 4:
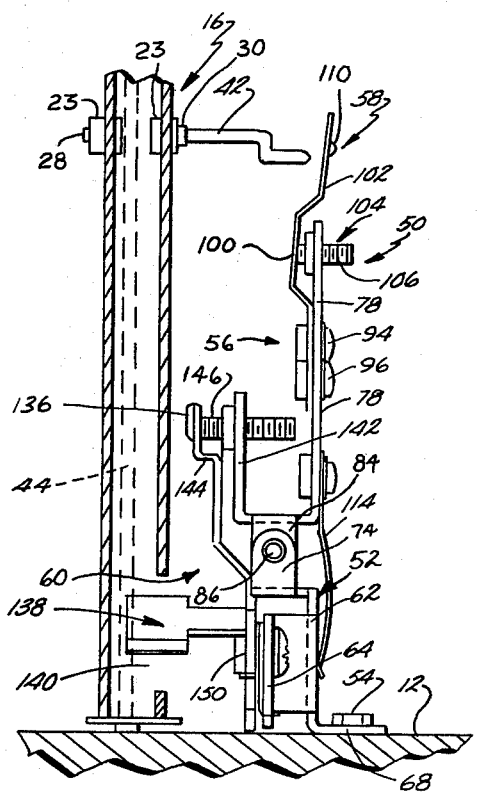
FIG. 4 is a fragmentary, partially sectioned, end elevational view of the pressure assembly of FIG. 3 as positioned in the data recorder.

A pressure arm assembly in accordance with the present invention is illustrated in FIG. 1 and generally designated 50. Pressure assembly 50 is a mechanical device which is secured to base 12 of the recorder and exerts a pressure on actuator arm 42 of head positioner 24 in order to bias the magnetic heads into contact with the disc recording medium. As best seen in FIGS. 3, 4 and 5, pressure arm assembly 50 includes a lower support bracket or support member 52 which is secured by suitable fasteners 54 to base 12 immediately adjacent diskette holder 16.

Pivotally secured to support bracket 52 is an upper bracket 56. Supported on the upper bracket 56 is a resilient plate or pressure arm 58. An automatic release means 60 carried by the bracket 52, as explained in detail below, maintains the pressure arm 58 out of contact with arm 42 until diskette 44 is inserted within holder 16.

In the embodiment illustrated, lower bracket 52 includes a generally channel-shaped central portion 62 and outwardly directed ears 64, 66. A horizontal mounting flange portion 68 extends outwardly from central portion 62. Formed integral with central portion 62, or secured thereto as a separate piece, is a yoke member 70 having legs 72, 74.

Upper bracket 56 includes a central portion 78 and a depending yoke portion 80 having legs 82, 84. A pivot pin 86 extends through legs 72, 82 and 74, 84 to pivotally mount upper bracket 56 for rotation about a transverse axis relative to lower support bracket 52. Pressure arm 58 is adjustably secured for vertical movement relative to bracket portion 78. The vertical adjustment may be provided by slots 90, 92 formed in portion 78. Pressure arm 58 is secured to portion 78 by suitable fasteners 94, 96 extending through slots 90, 92 and suitable apertures formed in arm 58.

As best seen in FIG. 4, pressure arm 58 is generally channel-shaped in section including a central portion 100 and an upper portion 102. A suitable adjustment means 104 is carried by upper bracket central portion 78 and engages central portion 100 of arm 58. Adjustment means 104, in the embodiment illustrated, comprises a set screw 106 threadably receiver within a bore 108 and engaging central portion 100. Adjustmemt of set screw 106 positions the resilient pressure arm 58 relative to central portion 78 of the upper bracket assembly.

Plate or pressure arm 58 includes an elongated groove 110 extending transversely thereacross. Groove 110, as explained below, defines a track within which actuator arm 42 of the head support or positioner 24 rides. A mechanical means in the form of a spring 114 is carried by the upper bracket 56 and engages lower bracket 52. In the preferred embodiment illustrated, spring 114 is a leaf spring and biases pressure plate 58 and upper bracket 56 towards the diskette holder 16. Spring 114 provides a spring force which in conjunction with the resiliency of plate 58, determines the bias pressure exerted on arm 42 and hence the pressure that the heads exert on the disc recording medium.

The automatic release means generally designated 60 includes a generally C-shaped lever 130 (FIG. 3). Lever 130 includes an elongated leg portion 132, a base portion 134 and a pressure arm engaging leg portion or stop portion 136. Extending perpendicular to portion 132 is an angled actuating ramp or diskette engaged member 138. As seen in FIGS. 1 and 4, pressure arm assembly 50 is positioned closely adjacent holder 16. Ramp 138 extends through an opening 140 formed in the lower rear corner of the holder and is positioned within the confines of the holder 16. Upper bracket assembly 56 includes a forward vertical portion 142 which is engaged by leg portion 136 (FIG. 4). In the preferred form, leg portion 136 is stepped at 144 and a set screw 146 is threadably secured to portion 142. Screw 146 rides on leg portion 136. Set screw 146 permits relative adjustment in the fore and aft or front to back direction of the upper bracket 56 relative to leg portion 136 about pivot pin 86 as is clear from FIG. 4. When lever 130 is in the position illustrated in FIG. 3 and FIG. 4, it will engage the set screw 146 and hence hold the pressure plate 58 in a first, nonoperating position out of contact with arm 42 of the head carrier. Lever 130 is pivoted at the outer end of leg portion 132 by a suitable pivot pin 150 extending through ear 64 of lower support bracket 52. A reset spring or lever reset means 154, as seen in FIGS. 3 and 5, has one free end 155 secured to ear 64 of bracket 52 and the other end 157 engaging the lever leg portion 132. Spring 154 biases lever 130 for rotation in a clockwise direction when viewed in FIG. 3. A stop tab 156, formed as part of leg portion 132, will engage base plate 12 to limit rotational movement of the lever 130.

OPERATION

The pressure arm assembly 50 is secured closely adjacent diskette holder 16 so that ramp 138 of lever 130 extends into diskette holder 16 (FIG. 4). When a diskette 44, schematically illustrated in FIG. 4, is inserted into the holder, one corner will engage rap 138 causing lever 130 to rotate in a counterclockwise direction when viewed in FIG. 3 until portion 136 thereof moves out of engagement with set screw 146. The ramp is angled (FIG. 3) to conform to the angled corner of conventional diskettes. The upper pressure arm assembly, including bracket 56 and resilient plate or pressure arm 58, will pivot or rotate about a transverse axis defined by pin 86 towards the diskette holder 16 under the action of leaf spring 114 until plate 58 engages arm 42 of head support or positioner 24. This is clearly shown in FIG. 6 wherein diskette 44 is seen in position at slot 18 formed in holder 16.

When diskette 44 is removed from the holder 16, the holder is first pivoted relative to the hub assembly 20. This moves the hub out of engagement with the disc. When viewed in FIG. 4, the holder will be pivoted to the right. Upon pivotal movement to the right, holder 16 will engage the upper pressure arm assembly including the upper bracket 56 and plate 58 and pivot same to the right or away from lever 130 about the transverse pivot axis defined by pin 86. Upon this limited pivotal movement, the set screw 146 will clear leg portion 136 of the lever 130. The lever will then be pivoted under the action of coil spring 154 to its first position. Movement of the lever 130 will be stopped by tab 156 engaging plate 12. Upon return movement of the disc holder 16, set screw 146 will engage leg portion 136. The pressure arm assembly is therefore automatically reset and plate 58 is held out of contact with arm 42 and the heads of the recorder are in a retracted position.

The pressure arm assembly in accordance with the present invention is a completely mechanical device which eliminates the adverse magnetic fields associated with solenoids which have heretofore been employed to shift recorder heads out of and/or into contact with the floppy disc recording medium. The device is simple and easily manufactured from rigid plastic or metal materials employing conventional manufacturing techniques. The device is automatically reset upon pivotal movement of the diskette holder 16 when a disc and sleeve are removed therefrom. The pressure arm assembly is automatically released to bias the heads into contact with the disc upon insertion of a diskette into the holder 16. Adjustment of pressure plate 58 is quickly and easily accommodated by set screws 106 and 146. This eliminates criticality in the positioning of the lower support bracket 52 on the base 12. Further, the plate 58 is vertically adjustable relative to bracket 52 thereby permitting fine adjustment in the positioning of the pressure assembly. Precise control over the biasing force exerted on the head positioner or head support is readily accomplished by proper selection of spring 114.

The pressure arm assembly in accordance with the present invention is simple, easily manufactured and reliable in operation. The assembly eliminates the problems heretofore experienced with the use of solenoid operated devices and also reduces the cost of the data recorders. Although described primarily for use in a double sided floppy disc recorder, the assembly would have utility in a floppy disc recorder employing only a single head. In view of the above description, various modifications will undoubtedly become apparent to those of oridinary skill in the art which would not depart from the inventive concepts disclosed. For example, a coil spring could be employed in place of the leaf spring 114 illustrated. Further, the specific configuration of the support bracket and upper arm bracket could be varied from that illustrated. The primary considerations are the provision of mechanical pressure means supported for movement towards and away from a disc holder and the provision of means for releasing the pressure means so that it may move to an operating position. Therefore, it is expressly intended that the above description should be considered as that of the preferred embodiment only. The true spirit and scope of the present invention will be determined by reference to the appended claims.

The embodiments of the invention in which an exclusive property or privilege is claimed are defined as follows:

1. A pressure arm assembly adapted for use in a data recorder of the type including a base, a diskette holder pivotally mounted to the base, a head support assembly carrying at least one head thereon and being adjustably mounted on the recorder to move the head into and out of operation contact with a disc medium positioned within the holder, and drive means engaging the head support for translating the head support and hence the head along the disc medium, said pressure arm assembly comprising:
   a bracket adapted to be secured to the base of the data recorder;
   a pressure arm;
   means for pivotally connecting said pressure arm to said bracket and for permitting a portion of said pressure arm to rotate towards and away from the head support assembly;
   resilient mechancial means for biasing the pressure arm towards the head support assembly; and
   a release member carried by the bracket and being movable with respect to said pressure arm, said release member having a first position wherein said release member abuts said pressure arm and holds the pressure arm away from said head support assembly against the bias of said resilient mechanical means, and a second position wherein said release member disengages said pressure arm upon insertion of a diskette into the diskette holder, thereby permitting said resilient mechanical means to move said pressure arm into engagement with the head support assembly and force the head into operative contact with the disc medium.

2. A pressure arm assembly as defined by claim 1 wherein said release member comprises:
   a lever pivoted to the bracket, and lever including a diskette engaged member disposed in the holder at a position to abut the diskette upon insertion thereinto and thereby automatically shift said release member from said first position to said second position.

3. A pressure arm assembly as defined in claim 2 wherein said release means further includes lever reset means engaging said lever for resetting the release member by moving the release member from its second to its first position upon pivotal movement of the pressure arm away from the diskette holder.

4. A pressure arm assembly as defined in claim 3 wherein said reset means comprises a reset spring engaging the lever and biasing the release member towards its first position.

5. A pressure arm assembly as defined by claim 4 wherein said lever includes a stop tab portion, said stop tab portion adapted to contact the base of the data recorder to stop said lever in its first position under the bias of the reset spring.

6. A pressure arm assembly as defined by claim 5 further including adjustment means carried by the pressure arm and engaging the lever for adjusting the position of said pressure arm relative to said lever when said lever is in its first position.

7. A pressure arm assembly as defined by claim 6 wherein said pressure arm includes a plate having an elongated groove therein defining a track within which a portion of the data recorder head support assembly rides during operation of the data recorder.

8. A pressure arm assembly as defined by claim 7 further including means for adjusting the vertical position of said plate relative to said bracket.

9. A pressure arm assembly as defined by claim 8 further including means for adjusting the transverse position of said plate relative to said bracket when said lever is in the first position.

10. A pressure arm assembly as defined by claim 9 wherein said resilient mechanical means comprises a leaf spring engaging the bracket to bias the pressure arm towards the diskette holder and the head support assembly.

11. A pressure arm assembly as defined in claim 1 wherein said resilient mechanical means comprises a leaf spring engaging the bracket to bias the pressure arm towards the diskette holder and the head support assembly.

12. In a double-sided data recorder of the type having a base, a diskette holder supported on the base in a generally vertical position for limited pivotal movement about a vertical axis, a drive hub for rotating a recording disc insertable within the holder, a pair of magnetic heads mounted on a carrier, means for translating the carrier relative to the holder so that the heads move radially of a recording disc, the carrier including an arm whereby movement of the arm biases both heads into engagement with the disc and the holder being pivotal to a nonoperating position permitting a disc to be inserted therein past the drive hub, the recorder further including improved pressure means for biasing the heads into engagement with the disc, said improved pressure means comprising:
   a support secured to the base immediately adjacent the holder;
   resilient mechanical pressure means carried by the support and movable from a first position to a second position for exerting a pressure on the carrier arm to bias the heads into engagement with the disc; and automatic mechanical release means carried by the support for holding the pressure means in the first position out of engagement with the carrier arm and for automatically releasing the pressure means for movement to the second position in engagement with the carrier arm upon insertion of a disc into the holder.

13. In a double-sided data recorder as defined by claim 12 wherein said automatic release means comprises:

a lever pivoted to said support and including a stop portion engaging the pressure means to hold the pressure means in the first position when the lever is in a first position, said lever further having a portion extending into the holder and engaged by a disc inserted into the holder for shifting the stop portion out of contact with the pressure means allowing the pressure means to move to the second position when the lever is in a second position.

14. In a double-sided data recorder as defined by claim 13 wherein said automatic release means further includes reset means for biasing the lever to its first position at which said stop portion is in position to engage said pressure means, said lever including a tab engaging the base to limit movement of the lever to its first position under action of the reset means.

15. In a double-sided data recorder as defined by claim 14 wherein said reset means comprises a spring carried by the support and engaging the lever.

16. In a double-sided data recorder as defined by claim 15 wherein said mechanical pressure means comprises:

a first member pivoted to the support for rotary movement about a transverse axis;

a second member adjustably carried by said first member for vertical movement relative to said first member; and a spring engaging said first member for biasing said first member towards said holder and towards the pressure means second position.

17. In a double-sided data recorder as defined by claim 16 wherein said pressure means further includes an adjustment means for shifting the second member relative to said first member towards and away from the holder.

18. In a double-sided data recorder as defined by claim 12 wherein said mechanical pressure means comprises:

a first member pivoted to the support for rotary movement about a transverse axis;

a second member adjustably carrier by said first member for vertical movement relative to said first member; and a spring engaging said first member for biasing said first member towards said holder and towards the pressure means second position.

19. In a double-sided data recorder as defined by claim 18 wherein said pressure means further includes an adjustment means for shifting the second member relative to said first member towards and away from the holder.

* * * * *

UNITED STATES PATENT AND TRADEMARK OFFICE
CERTIFICATE OF CORRECTION

PATENT NO.   :   4,393,424
DATED        :   July 12, 1983
INVENTOR(S)  :   Mohan P. Vidwans It is certified that error appears in the above-identified patent and that said Letters Patent is hereby corrected as shown below:

Column 3, line 35;
  "receiver" should be --received--

Column 5, Claim 1, line 40;
  "operation" should be --operative--

Column 6, Claim 11, line 44;
  "in claim 1" should be --by claim 1--

Column 8, Claim 18, line 22;
  "carrier" should be --carried--

Signed and Sealed this

Eleventh    Day of    December 1984

[SEAL]

Attest:

GERALD J. MOSSINGHOFF

Attesting Officer    Commissioner of Patents and Trademarks